J. MacKENZIE.
SEAL.
APPLICATION FILED JAN. 27, 1916.
1,200,962.
Patented Oct. 10, 1916.
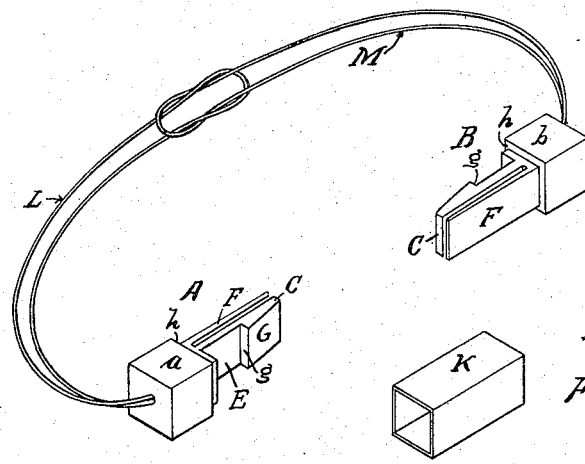
Fig. 1.
Fig. 3.
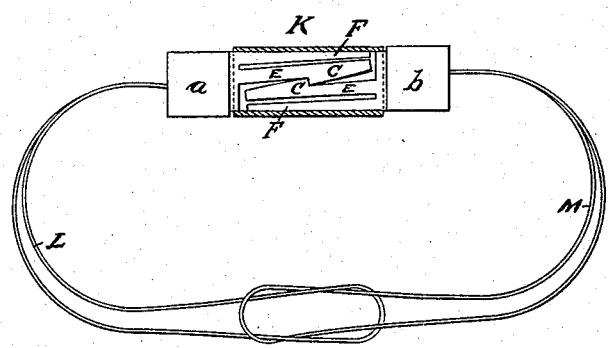
Fig. 2.
Witnesses
Ernest D. Jansen
Beulah Carle
Inventor
John MacKenzie,
by Frederick W. Cameron.
Atty.

UNITED STATES PATENT OFFICE.

JOHN MacKENZIE, OF WATERVLIET, NEW YORK.

SEAL.

1,200,962.   Specification of Letters Patent.   Patented Oct. 10, 1916.

Application filed January 27, 1916. Serial No. 74,597.

*To all whom it may concern:*

Be it known that I, JOHN MACKENZIE, a citizen of the United States of America, residing at the city of Watervliet, in the county of Albany and State of New York, have invented certain new and useful Improvements in Seals, of which the following is a specification.

My invention relates to seals, and the object of my invention is to provide a seal adapted for use on express cars or meters, or in other places where it is desirable that the compartment, meter or inclosure shall not be opened without breaking the seal; together with such other elements and combinations as are hereinafter more particularly set forth and claimed. I accomplish these objects by means of the mechanism illustrated in the accompanying drawing, in which:

Figure 1 is a perspective view of the seal open. Fig. 2 is a section through the seal when the parts are brought together. Fig. 3 is a perspective view of the sealing sleeve used for covering the engaging parts as shown in Figs. 1 and 2.

Similar letters refer to similar parts throughout the several views.

My seal is made of two portions, A, B, each having a block, a, b, to each of which is attached or formed integral therewith the plates, E, F. The plate, E, has formed at one end thereof a latch, G, made by beveling the forward end of the plate, and at the rear of the beveled portion forming the right angled shoulder, g, so arranged that when the two blocks, a, b, approach each other, the beveled side of one latch will ride on the beveled side of the other and press the plates, E, toward the plates, F, until the shoulders, g, g, pass each other, when the resiliency of the plates, E, will cause the latches to engage with each other, the shoulders, g, g, interlocking and preventing the separation of the blocks, a, b. The plate, F, protects the latches from being manipulated after they are locked together as hereinafter described. In order to keep these parts locked together as heretofore described, I have provided the sealing sleeve, K, which is preferably a rectangular tube, as shown in Fig. 3, which will fit between the projecting sides, h, h, of the blocks, a, b, and into which sealing sleeve the plates, E, F, project in the act of bringing the latches together so that when locked the parts will occupy the position shown in section in Fig. 2. The projecting portions, h, h, prevent the movement of the sealing sleeve. The plates, F, F, coming against the interior walls of the sealing sleeve, K, prevent the latches from being affected by any pressure against the sides of the sealing sleeve for the purpose of disengaging the latches, and effectually protect the opening of the seal so long as the sealing sleeve is not broken and removed. It is apparent that as long as the sealing sleeve, K, is in position around the plates, F, F, the latches cannot become disengaged. The only way to break the connection is to first destroy the sleeve. I have shown attached to each of the blocks, a, b, a wire or cable, or string, L, M, which is fastened together at the ends. Of course it is understood that the blocks may be secured to any locking device as desired.

What I claim as my invention and desire to secure by Letters Patent is:

A seal comprising two like parts, each provided with a block; a spring latch comprising a plate with a beveled projection near one end; a protecting plate extending substantially parallel to the latch but separated slightly therefrom; a sealing sleeve into which said latches project and which is adapted to cover the adjacent latches when they are locked together; with means on the said blocks for preventing the sealing sleeve from being removed from its place about the latches.

In testimony whereof I have affixed my signature in presence of two witnesses.

JOHN MacKENZIE.

Witnesses:
 FREDERICK W. CAMERON,
 BEULAH CARLE.

Copies of this patent may be obtained for five cents each, by addressing the "Commissioner of Patents,
Washington, D. C."